United States Patent [19]

Lindstaedt

[11] 4,076,446
[45] Feb. 28, 1978

[54] CONDUIT REAMER
[76] Inventor: Robert F. Lindstaedt, 717 N.
McDowell - No. 501, Petaluma,
Calif. 94952
[21] Appl. No.: 777,637
[22] Filed: Mar. 15, 1977
[51] Int. Cl.$^2$ ............................................. B23B 51/00
[52] U.S. Cl. ..................................... 408/227; 408/211
[58] Field of Search ............... 408/211, 226, 227, 228,
408/189; 30/299, 276, 172, 173, 174, 175, 178,
179

[56] References Cited
U.S. PATENT DOCUMENTS

| 3,720,477 | 3/1973 | Rusin | 408/226 |
| 3,917,429 | 11/1975 | Ertley | 408/227 |
| 3,990,806 | 11/1976 | Meyers | 408/211 |

Primary Examiner—Harrison L. Hinson
Attorney, Agent, or Firm—Victor R. Beckman

[57] ABSTRACT

A reamer for use with conduits comprising positioning means including engaging inclined surfaces for maintaining the reamer in relatively fixed relationship with the front or outer edge of the conduit being reamed, with the positioning means being capable of engaging conduits of various diameters and rotatable relative to the conduit being reamed. Reamer elements are provided including a front end for positionment adjacent the aperture in the conduit being reamed and a pair of inclined sections extending outwardly from said front end in opposing inclination to the engaging inclined surfaces, and being capable of engaging the inner edge of the conduit being reamed and rotated relative thereto. Mounting means is operatively associated with the positioning means and the reamer elements to provide relative longitudinal adjustment between the engaging surfaces and the inclined sections so as to obtain displacement therebetween, and adjustment means for manually moving the reamer elements to various positions relative to the positioning means to accommodate conduits of various sizes is provided.

10 Claims, 3 Drawing Figures

CONDUIT REAMER

BACKGROUND OF THE INVENTION

1. Field of the Invention

The present invention relates to a manually utilized tool that acts as a reamer for use in deburring conduits of various diameters.

2. Description of the Prior Art

The problem of deburring or reaming of a hole has been a long standing problem, and attempts have been made to solve this problem in the prior art, as illustrated in U.S. Pat. Nos. 2,196,701 and 3,122,947. U.S. Pat. No. 2,196,701 is directed to an area of application for which the present conduit reamer is primarily directed, which is for an electrician for use in the field. A sharp burr on the inner edge of a conduit can cut through the plastic insulation on a wire. This fact was appreciated in U.S. Pat. No. 2,196,701 and an attempt was made to use one edge of the tool to accomplish this purpose.

I have found that a reamer that is adaptable to various diameter conduits provides for a more efficient and practical solution to the problem.

OBJECTS OF THE INVENTION

An object of the present invention is to provide a reamer that is easily utilized on conduits of various diameters to debur the inner and outer edges of the conduit opening and may be carried in the pocket of the person using same.

Another object of the present invention is to provide a reamer in which a reamer element is maintained in position by means of engaging surfaces so as to permit rotation of the reamer element relative to the conduit.

Other objects and advantages of the present invention will become apparent as the disclosure proceeds.

SUMMARY OF THE INVENTION

A reamer for use with conduits comprising positioning means including engaging inclined surfaces for maintaining the reamer in relatively fixed relationship with the front or outer edge of the conduit being reamed, with the positioning means being capable of engaging conduits of various diameters and rotatable relative to the conduit being reamed. Reamer elements are provided including a front end for positionment adjacent the aperture in the conduit being reamed and a pair of inclined sections extending outwardly from said front end in opposing inclination to the engaging inclined surfaces, and being capable of engaging the inner edge of the conduit being reamed and rotated relative thereto.

Mounting means is operatively associated with the positioning means and the reamer elements to provide relative longitudinal adjustment between the engaging surfaces and the inclined sections so as to obtain displacement therebetween, and adjustment means for manually moving the reamer elements to various positions relative to the positioning means to accommodate conduits of various sizes is provided.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
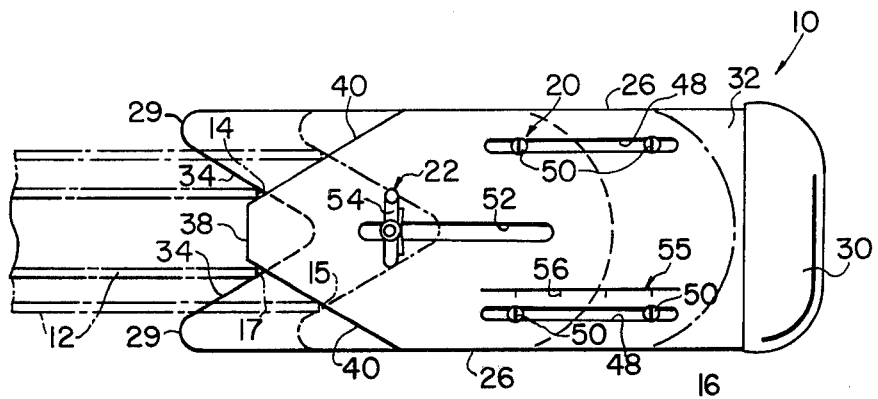
FIG. 1 is a top plan view of the reamer in accordance with the present invention.
Figure 2:
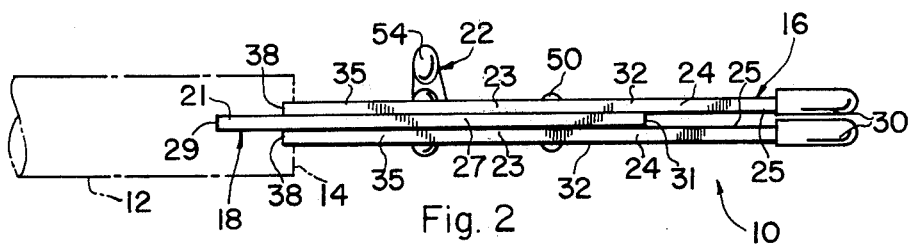
FIG. 2 is a side elevational view of the reamer illustrated in FIG. 1.
Figure 3:
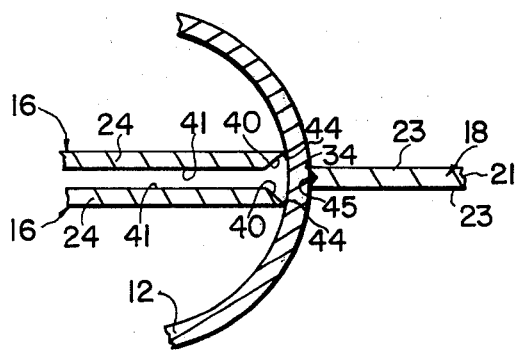
FIG. 3 is a fragmentary sectional view illustrating the manner in which the conduit is reamed.

Referring to the drawings, there is illustrated in FIGS. 1-3 a reamer 10 that is designed for use with conduits 12 that may vary in diameter and can be carried in one's pocket. The conduit 12 has a front end 14 with an inner edge 15 and outer edge 17. The inner edge 15 generally has burrs thereon and in accordance with presently existing standards, the reamer 10 can ream both the inside edge 15 and outside edge 17 simultaneously. The reamer 10 is ideally suited for conduits 12 ranging from ½ inch to 1¼ inch diameter. A slightly larger reamer can be made to accommodate conduits from 1¼ inch to 2 inch. The term "conduit" as used herein is intended to include electric metalic tubing.

Accordingly, the present invention provides a dual function in the reamer 10 which can easily be carried in an electrician's pocket for use with a variety of conduits of differing diameter. The reamer 10 comprises a pair of reamer elements 16, positioning means 18, and mounting means 20. The mounting means 20 is operatively associated with the positioning means 18 and reamer elements 16. Adjustment means 22 is provided for manually adjusting the reamer elements 16 to various positions relative to the positioning means 18 to accommodate conduits 12 of various sizes or diameters.

The positioning means 18 performs the function of maintaining the reamer elements 16 in relatively fixed relationship with the front end 14 of the conduit 12 being reamed. The positioning means 18 may include an elongated base 21 adapted to extend between the reamer elements 16. The positioning means 18 has substantially planar surfaces 23 in spaced apart relationship to each other. The base 21 further includes side walls 27 and a front edge 29 and a rear edge 31.

Adjacent the forward or front edge 29 of the base 21 there is provided a pair of inclined engaging surfaces or edges 34. The inclined engaging surfaces 34 are formed in substantially a "V" shaped configuration. This angle defined between the engaging surfaces 34, permits a variety of diameters to be positioned therebetween as illustrated in FIG. 1. The engaging surfaces 34 contact the outside or outer edge 17 of the conduit 12.

The reamer elements 16 each include a plate 24 that may include an end cap 30. The cap 30 functions to cover any sharp edges that may normally be contained on the rear of the plates 24. The plates 24 further include outer or upper surfaces 32 that extend horizontally.

Each of the reamer elements 16 include an elongated plate 24 having a pair of sides 35 that may extend the same width as the side walls 27 of the base 21. A front end 38 is provided on each plate 24 with a pair of inclined sections 40, that are capable of engaging the inner edges 15 of the conduit 12 being reamed and simultaneously rotated relative thereto. The engaging surfaces 34 provided on the base 21 are angularly disposed in reverse to the angle of inclination of the inclined section 40. In this manner longitudinal adjustment between the engaging surfaces 34 of the positioning means 18 and the inclined sections 40 of the reamer elements 16 cross each other to accept conduits of different diameters. The inner planar surfaces 41 of each reamer element 16 have interposed therebetween upper and lower planar surfaces 23 that are provided on the base 21 to permit sliding engagement therebetween.

As illustrated in FIG. 3, the engaging surfaces 40 may be inclined or beveled relative to the inner planar surface 41 to provide a leading edge 44 for engaging the inner edge 15 of the conduit 12. As illustrated in FIG. 3, the inclined beveled edge 44 extends outwardly from the inner planar surface 41. The inclined sections 34 may include a groove 45 between the spaced apart planar surfaces 23. In this manner the necessary gripping is obtained in order to deburr the inner and outer edges 15 and 17 respectively, of the conduit 12.

The mounting means 20 includes a pair of elongated channels or grooves 48 that may be contained in each of the plates 24. At least one pin 50 extends in each of the channels 48. The pin 50 may extend through the reamer elements 16 to maintain the plates 24 and base 21 in assembled relationship. In this manner the base 21 is free to move linearly relative to the plates 24 for obtaining the longitudinal adjustment that is required.

The adjustment means 22 comprises an opening 52 extending in at least one of the plates 24. A lever 54 is coupled at one end to the base 21 and extends above the plate 24. In this manner the lever 54 may be engaged by a finger of the user for manual engagement therewith to maintain the reamer elements 16 in relatively fixed relationship with the inner edge 15 of the conduit 12 being reamed.

Indicia means 55 may be provided in the form of a scale 56 on the upper surface 32 to indicate to the user the approximate diameter of the conduit being reamed. This is accomplished since the angle or slope of the engaging surfaces 34 and inclined sections 40 are known and therefore the longitudinal adjustment for various diameter conduits may be readily calculated.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A reamer for use with a conduit, said reamer comprising:
   a. positioning means, including engaging surfaces for maintaining the reamer in relatively fixed relationship with the front of the conduit being reamed,
   b. said positioning means, being capable of engaging conduits of various diameters and rotatable relative to the conduit being reamed,
   c. a reamer element mounted on each side of said positioning means, each said reamer element including a front end for positionment adjacent the aperture in the conduit being reamed and a pair of inclined sections extending outwardly from said front end and being capable of engaging the inner edge of the conduit being reamed and rotated relative thereto,
   d. mounting means operatively associated with said positioning means and said reamer elements to provide relative longitudinal adjustment between said engaging surfaces and said inclined sections so as to obtain displacement therebetween, and
   e. adjustment means for manually relatively linearly moving said reamer elements and positioning means to accommodate conduits of various sizes.

2. A reamer as in claim 1,
   a. said reamer elements each comprise an elongated plate adapted to be hand held having surfaces in spaced apart relationship to each other,
   b. said positioning means including an elongated base extended between said spaced apart surfaces of said plates to permit said longitudinal adjustment relative thereto,
   c. said engaging surfaces provided on said base being angularly disposed inwardly relative to the front end thereof, and
   d. said inclined sections of each of said plates being disposed outwardly relative to said engaging surfaces of said base for engagement of said inclined sections and engaging surfaces with the inner and outer edges of the conduit, respectively, such that the longitudinal adjustment between said engaging surfaces of said positioning means and said inclined sections of said reamer elements cross each other to accept conduits of different diameters.

3. A reamer as in claim 2, wherein each said plate includes a cap at the rear end thereof in spaced relationship to said inclined sections.

4. A reamer as in claim 2, wherein said inclined sections of each of said plates form a "V" shaped configuration.

5. A reamer as in claim 2, wherein:
   a. said plates each include an inner planar surface,
   b. said base includes planar surfaces on each side thereof, and
   c. said planar surfaces of said base being in sliding engagement with said planar surfaces of each of said plates.

6. A reamer as in claim 5, wherein each said inclined sections extend in a plane inclined to said inner planar surface to provide an edge for engaging the front of the conduit.

7. A reamer as in claim 6, wherein each said edge provided at said inclined sections is inclined outwardly from one said planar surface.

8. A reamer as in claim 5, wherein said engaging surfaces include a groove thereon with spaced apart edges for engaging the outer edge of the conduit.

9. A reamer as in claim 2, wherein said mounting means includes:
   a. a pair of elongated spaced apart channels longitudinally extending in each of said plates, and
   b. a pin coupled to said base and extending in each of said channels in each of said plates, such that said base is free to move relative to said plates for obtaining said longitudinal adjustment.

10. A reamer as in claim 1, wherein said adjustment means comprises:
    a. an opening extending through at least one of said plates,
    b. a lever coupled at one end to said base and extending above said one plate such that it may be engaged by a finger of the user for manual engagement therewith to maintain said reamer elements in relatively fixed relationship with the inner edge of the conduit being reamed.

* * * * *